April 21, 1964    H. A. MAY ETAL    3,129,983
OIL DIVIDER
Filed July 6, 1962

INVENTORS
HORACE A. MAY
GUY W. MILLER
BY Charles A. Warren
ATTORNEY 3,129,983
OIL DIVIDER
Horace A. May, Glastonbury, and Guy W. Miller, Vernon, Conn., assignors to United Aircraft Corporation, East Hartford, Conn., a corporation of Delaware
Filed July 6, 1962, Ser. No. 207,870
6 Claims. (Cl. 308—36.1)

This invention relates to an arrangement for dividing a flow of fluid within a rotating shaft into two metered flows.

One feature of the invention is a device by which lubricant or any other liquid may be divided within a rotating shaft such that a selected quantity of the fluid may be delivered to each of two or more different points of use, for example, one part of the liquid might be delivered to a bearing and another might be delivered to an area requiring cooling. Another feature is the metering of fluid supplied to a rotor shaft into two distinct flows.

In a twin-spool gas turbine engine as described, for example, in the Savin Patent No. 2,747,367, it is desirable for purposes of weight reduction to lighten the shafts connecting the compressor spools to the turbine discs and to use an intershaft seal and bearing between the shafts for additional support for the inner of the two shafts. One feature of the invention is an arrangement for supplying from a single fluid supply two distinct fluid flows, one for lubricating the intershaft bearing and the other for cooling the intershaft seal by which leakage of oil from the intershaft bearing is controlled.

Other features and advantages will be apparent from the specification and claims, and from the accompanying drawing which illustrates an embodiment of the invention.

Figure 1:
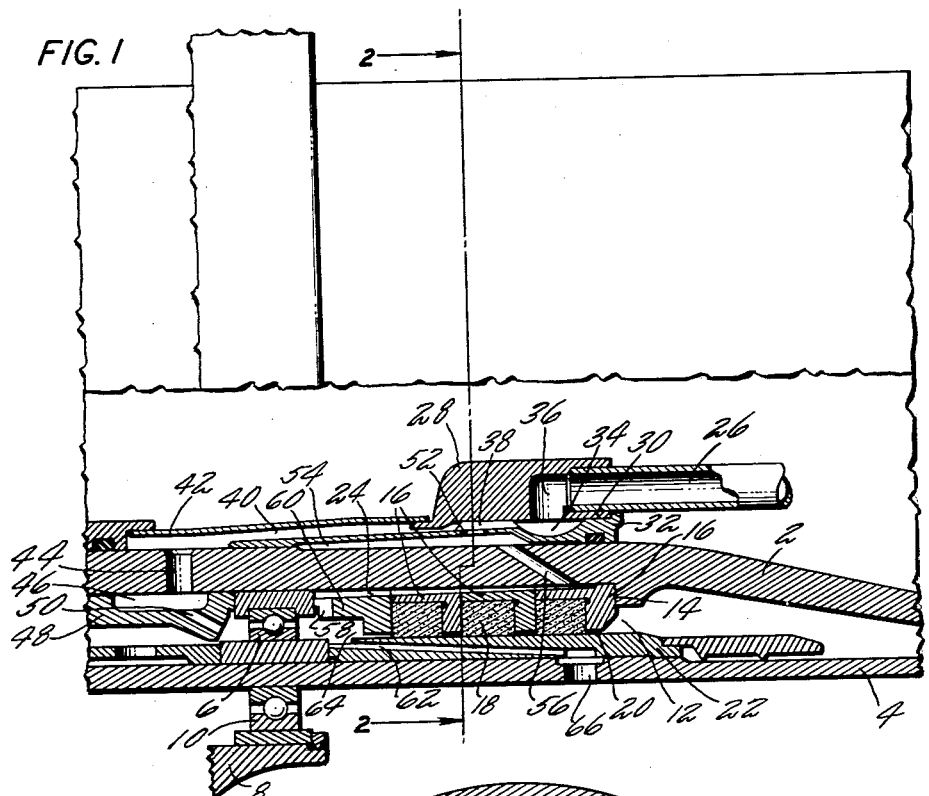
FIG. 1 is a fragmentary longitudinal sectional view through a pair of concentric shafts incorporating the invention.
Figure 2:
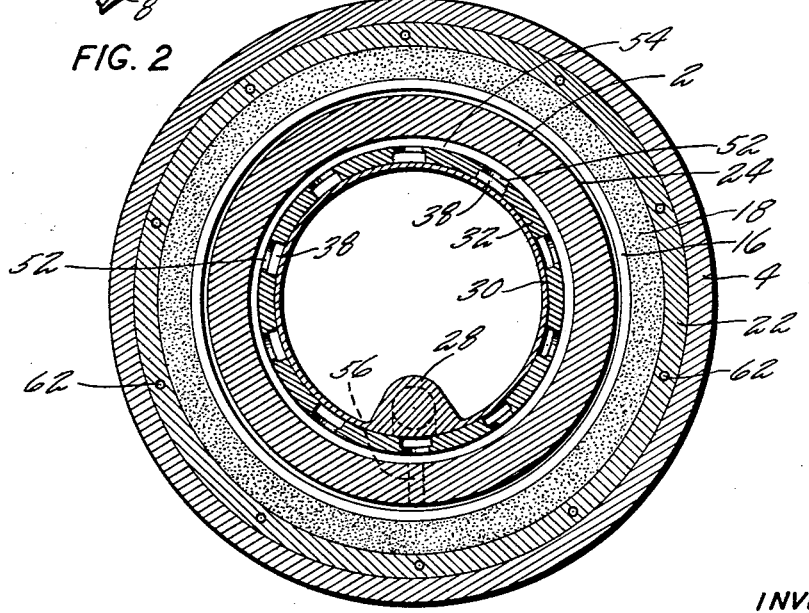
FIG. 2 is a transverse sectional view substantially along the line 2—2 of FIG. 1.

The arrangement is shown in connection with a pair of concentric shafts 2 and 4, the inner shaft being supported within the outer shaft by an intershaft bearing 6. These shafts may be, for example, the interconnection shafts between the compressor and turbines in a twin-spool, or split, gas turbine engine, as described in the above-identified Savin patent. It will be understood that both shafts 2 and 4 rotate and shaft 4 is supported within a housing represented by the fragmentary portion 8 which carries a bearing 10 for shaft 4. Although the bearings 6 and 10 are shown in radial alignment they are not necessarily so positioned. With respect to the bearing 6, the outer shaft 4 constitutes a housing within which the hollow shaft 2 is supported by bearing 6.

The space 12 between the two shafts is preferably sealed at one side of the bearing 6 to prevent leakage of lubricant away from the bearing. To this end the shaft 2 has a shoulder 14 against which is clamped one seal holder 16 of a plurality of similar seal holders 16, each of which carries a seal ring 18 which may be a carbon seal ring in a position to engage with a surface 20 on a sleeve 22 clamped within the outer shaft 4. The seal holders 16 have axially extending grooves 24 on their inner surfaces to provide passages for the flow of cooling fluid between the inner shaft 2 and the seal carrying rings. The seal carriers are clamped in position on shaft 2 and the carbon seal rings may be split in which case they are urged radially into engagement with sleeve 22 by centrifugal force.

A supply of lubricant for the bearing 6 is supplied to the inner surface of the inner shaft 2 through a supply pipe 26 connected to a boss 28 on a receiving ring 30 positioned within a sleeve 32 on the inner surface of the inner shaft 2. The sleeve 32 has an annular groove 34 on its inner surface which is in communication with the passage 36 in the boss 28, as best shown in FIG. 1, so that lubricant from the supply pipe 26 enters the annular groove 34. From the groove 34 the lubricant flows axially through a plurality of axial grooves 38 formed in the inner wall of the sleeve 32 to enter a chamber 40 between the sleeve 32 and an inner smaller-diameter sleeve 42 forming an extension of the ring 30. A radial passage 44 through the shaft 2 provides for a flow of lubricant from the chamber 40 to an annular chamber 46 provided by a ring 48 on the outer side of the sleeve 2. This ring 48 has a plurality of nozzle passages 50 therein through which lubricant is directed against the bearing 6, as will be apparent.

There is a second flow of liquid from the annular groove 34 and this is provided by radial passages 52 in the sleeve 32 in communication with certain of the axial grooves 38. Thus, if there are ten axial grooves 38 it might be advantageous to provide five radial passages 52 and these are of such dimension to meter the desired flow of lubricant through these openings and into a chamber 54 formed between the sleeve 32 and the surrounding shaft 2. The chamber 54 communicates with a passage 56 through the shaft 2 which communicates with the several grooves 24 underneath the seal-holding rings 16 so that lubricant functioning as a coolant can flow through the passage 26 and through the grooves 24 to be discharged through notches 58 formed in a clamping ring 60 which holds the several seal elements in position.

The sleeve 22 which is engaged by the seal elements 18 may have a plurality of obliquely positioned passages 62 therein for the discharge of lubricant from the space 64 to the right of the bearing 6 through the sleeve 22 thereby cooling it and thence through one or more radial passages 66 in the shaft 4 to a suitable sump. With this arrangement, it is possible for a metered quantity of lubricant delivered into the annular groove 34 to be further divided into two separate flow paths, one through the axial grooves 38 to the chamber 40 and the other through the radial passages 52 to chamber 54 so that the appropriate quantity of liquid from chamber 40 will reach the bearing 6 for lubricating it and the appropriate quantity of liquid from chamber 56 will reach the seals for cooling them.

It is to be understood that the invention is not limited to the specific embodiment herein illustrated and described, but may be used in other ways without departure from its spirit as defined by the following claims.

We claim:
1. In a fluid divider, a housing, a bearing within the housing and a hollow shaft within the housing supported by the bearing, a seal between the housing and shaft adjacent to the bearing and defining a first chamber between the bearing and seal, said seal having axially extending grooves on its inner surface for a flow of cooling fluid therethrough and said shaft having a radially extending passage therein for delivery of cooling fluid to said grooves, a sleeve within the hollow shaft and spaced in part from the inner surface of the shaft to define a second chamber communicating with the radially extending passage, an inner housing within said sleeve to define a third chamber radially inward of the sleeve, said sleeve and said inner housing also defining an annular groove axially spaced from said third chamber, axial grooves between the sleeve and housing for a flow of fluid from the annular groove to said third chamber and passages through said sleeve communicating with certain of said axial grooves for flow of fluid from the annular groove to said first chamber.

2. A divider as in claim 1 in which the shaft has a radially extending passage for fluid flow from said third chamber onto the bearing.

3. In a fluid divider, a shaft having a fluid passage therein, a sleeve on the inner surface of said shaft having a portion thereof spaced from the shaft to form a chamber between the shaft and sleeve in alignment with and communicating with the fluid passage, an inner housing within and spaced from the sleeve to define a second chamber therebetween, a plurality of axial passages on the inner surface of said sleeve and located between the sleeve and the inner housing and communicating at one end with a supply of fluid and at the other end with the second chamber for the supply of a measured quantity of fluid to said second chamber and a number of openings through said sleeve and connecting with certain of said axial passages for a flow of a measured quantity of fluid from said axial passages into said first chamber.

4. A divider as in claim 3 in which the shaft is a rotary shaft and is positioned within a second, also rotary shaft.

5. In an oil divider, a hollow shaft, a bearing surrounding and supporting said shaft, a seal adjacent to said bearing and surrounding said shaft, said seal having an axially extending passage between it and the shaft and said shaft having a supply passage therethrough communicating with said axial passage, a ring within and spaced from said shaft and a divider sleeve positioned between said shaft and ring and engaging with both, said sleeve being spaced in part from said shaft to define a first chamber therebetween communicating with said supply passage, a plurality of axial grooves formed on the inner surface of said sleeve and communicating at one end with a supply of fluid and at the other end with a second chamber between said sleeve and ring and at least one passage through said sleeve communicating with one groove and with the first chamber.

6. A divider as in claim 5 in which the shaft is a rotary shaft and is positioned within a second, also rotary shaft.

References Cited in the file of this patent
UNITED STATES PATENTS

| | | |
|---|---|---|
| 2,681,837 | Boyd | June 22, 1954 |
| 2,878,894 | Andrews | Mar. 24, 1959 |
| 2,911,267 | Small | Nov. 3, 1959 |
| 2,999,000 | Spat | Sept. 5, 1961 |
| 3,038,556 | Hamm | June 12, 1962 |
| 3,057,542 | Keenan | Oct. 9, 1962 |